Patented Dec. 20, 1938

2,140,694

UNITED STATES PATENT OFFICE 2,140,694

DEHYDRATION OF ORGANIC OXY COMPOUNDS

Theodore Evans, Martinez, Calif., assignor to Shell Development Company, San Francisco, Calif., a corporation of Delaware No Drawing. Application December 23, 1935,
Serial No. 55,865

18 Claims. (Cl. 202—42)

This invention relates to a process of dehydrating aqueous mixtures containing one or a plurality of organic oxy-compounds, and it more particularly relates to a method of effecting the removal of water from aqueous solutions of alcohols, aldehydes, ketones, carboxylic acid esters and other organic oxygen-containing compounds.

The process of the invention comprises treating the aqueous mixture or solution of the organic oxy-compound with a solvent for the organic oxy-compound, said solvent being substantially water immiscible and consisting of or essentially comprising an ether, and separating by physical means the excess of water and the solvent from the organic oxy-compound, whereby the organic oxy-compound is recovered in a more concentrated state.

A primary object of the invention is to provide a practical and economical process adaptable to the technical scale dehydration of organic oxy-compounds, particularly those organic oxy-compounds, as the alcohols, which form constant boiling mixtures with water and are accordingly difficult to efficiently and completely separate therefrom by ordinary distillation means.

Several methods, which involve the use of third agents and distillation means, have been proposed for effecting the concentration of ethyl alcohol-water and propyl alcohol-water solutions. These processes, due to the physical characteristics of the hydrocarbon third agents used therein, have in general been unsatisfactory. The hydrocarbon third agents in general are relatively immiscible with the alcohols as well as with water. Consequently, they are unsuitable in extraction processes and inefficient and uneconomical in distillation processes due to their low water-carrying capacity which makes it necessary to vaporize large quantities of the third agent to remove relatively small amounts of water.

Now, I have found that the disadvantages of the known processes may be obviated and a highly efficient process adaptable to extraction as well as distillation means of operation provided by using as a third agent an ether, preferably an ether selected from the group consisting of the aliphatic mixed ethers and the aliphatic symmetrical ethers, the latter possessing at least six carbon atoms to the molecule. The ethers selected from the above group possess all the characteristics required of an efficient extractant or water-carrying agent for the dehydration of aqueous neutral organic oxy-compounds, particularly aqueous solutions of the aliphatic alcohols. Such ethers in general have a high solvent power for the organic oxy-compounds and are capable of rapidly and substantially completely extracting them from their aqueous mixtures and dilute aqueous solutions. At the same time, the ethers herein described have a relatively low or a substantial insolubility in water; hence, losses of the extractant or water-carrying agent in the aqueous phase are inconsiderable. The members of the preferred group of ethers have boiling points within such a wide range of temperatures that for any organic oxy-compound to be dehydrated an ether having the desired boiling temperature with respect to the boiling temperature of the organic oxy-compound can be selected so as to obtain substantially the desired two-phase distillate. Thus when distillation methods of dehydration are resorted to an ether with a boiling temperature lower or higher than the anhydrous organic oxy-compound may be employed. In any case, an ether of sufficiently high boiling temperature to carry over sufficient water to form a condensed distillate stratifiable in two phases, an aqueous phase and an ether phase, is selected. In some cases, the ether can be so selected with respect to the organic oxy-compound that relatively small quantities of the latter are carried over and the condensed distillate is stratifiable into an aqueous phase and a non-aqueous phase materially predominating in ether.

It will be obvious from the foregoing that the aliphatic symmetrical ethers containing less than six carbon atoms to the molecule, namely, dimethyl ether and diethyl ether, are unsuitable for use in accordance with the present invention. These ethers have such low boiling temperatures and such low carrying capacities for water that their use would not result in the attainment of a condensed distillate containing sufficient water to stratify into two phases.

The following are examples of aliphatic symmetrical ethers which possess properties rendering them suitable for use in accordance with the invention: di-normal propyl ether, di-isopropyl ether, di-normal butyl ether, di-isobutyl ether, di-secondary butyl ether, di-tertiary butyl ether, the symmetrical normal, iso, secondary and tertiary amyl, hexyl, heptyl, octyl and the like ethers as well as the symmetrical unsaturated ethers as diallyl ether, the butenyl ethers as dicrotyl ether and diisobutenyl ether, the pentenyl ethers, the hexenyl ethers and the like and their homologues, analogues and suitable substitution products.

A preferably employed group of ethers embraces the aliphatic primary, secondary and tertiary mixed ethers of which the following members are representative: methyl propyl ether, methyl butyl ether, ethyl propyl ether, ethyl butyl ether, propyl butyl ether, propyl isopropyl ether, methyl isobutyl ether, ethyl isobutyl ether, propyl isobutyl ether, isopropyl isobutyl ether, methyl secondary butyl ether, methyl secondary amyl ether, methyl isoamyl ether, ethyl secondary butyl ether, ethyl secondary amyl ether, ethyl isoamyl ether, propyl secondary butyl ether, propyl secondary amyl ether, propyl isoamyl ether, isopropyl secondary butyl ether, isopropyl secondary amyl ether, isopropyl isoamyl ether, methyl tertiary butyl ether, ethyl tertiary butyl ether, propyl tertiary butyl ether, isopropyl tertiary butyl ether, methyl tertiary amyl ether, ethyl tertiary amyl ether and the like and their homologues, analogues and suitable substitution products, as well as mixed ethers wherein one or both of the organic radicals are unsaturated as ethyl isobutenyl ether, butyl isobutenyl ether, propyl isopentenyl ether and the like.

The ethers as above listed can be successfully used as components of complex solvents suitable for use in the process. For example, such ethers can be used together with other solvents, as the paraffin hydrocarbons, olefines, olefine polymers and the like and mixtures thereof, light naphthas, halogenated hydrocarbons and the like, and/or suitable organic oxy-compounds different from those treated, in order to produce solvents affording higher partition coefficients for the organic oxy-compound being extracted and having a lower solubility in water, as well as a lower capacity to dissolve water, thus increasing the efficiency with which neutral organic oxy-compounds can be extracted.

Although the process is preferably executed employing aliphatic ethers possessing the properties herein described, the invention is not to be regarded as limited to the use of aliphatic ethers. In some cases, excellent results may be obtained by using symmetrical ethers wherein the organic radicals linked to the ether oxygen atom are aromatic, aralkyl, alicyclic or heterocyclic radicals, or mixed ethers wherein one of the radicals linked to the ether oxygen atom is a primary, secondary or tertiary alkyl radical and the other radical linked to the ether oxygen atom is an aromatic, aralkyl, alicyclic or heterocyclic radical. As examples of such suitable ethers may be mentioned α-naphthol methyl ether, α-naphthol ethyl ether, α-naphthol propyl ether, β-naphthol methyl ether, β-naphthol ethyl ether, β-naphthol propyl ether, β-naphthol isopropyl ether, β-naphthol paratolyl ether, phenetol, anisol, phenol phenyl ether, the cresol cresyl ethers, mixtures of the cresol cresyl ethers and the like and their homologues, analogues and suitable substitution products.

The process of the invention is applicable broadly to the removal of water from aqueous mixtures of organic oxy-compounds as the alcohols, aldehydes, ketones, carboxylic acid esters and the like and their inorganic as well as organic substitution products, or mixtures of such organic compounds. The same is particularly applicable to the dehydration of neutral organic oxy-compounds as the alcohols and their neutral derivatives.

A preferably treated group of organic oxy-compounds may be represented by the general formula R—X, wherein R represents an organic radical when X represents one of the groups

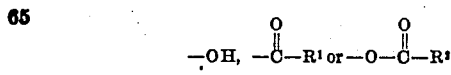

or a hydrogen atom or an organic radical when X represents

$R^1$ representing an organic radical linked to the carbonyl group by a carbon atom, and $R^2$ representing a hydrogen atom or an organic radical linked to the carbonyl group by a carbon atom. It will be seen that when X equals the aldehyde group

R may equal H in which case the compound is formaldehyde HCHO. When R equals an organic radical and X equals the group

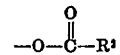

wherein $R^2$ equals a hydrogen atom, the general formula becomes R—OOCH and the compound is a formate, while when $R^2$ equals an organic radical linked to the carbonyl group by a carbon atom, the compound is a carboxylic acid ester of an acid higher than formic acid. The aliphatic organic oxy-compounds may be represented by the above-illustrated general formula wherein R and $R^2$ represent hydrogen atoms or alkyl radicals and $R^1$ represents an alkyl radical, wherein R, $R^1$ and $R^2$ may be the same or different and represent alkyl radicals or substituted alkyl radicals of primary, secondary or tertiary character.

The aldehydes and ketones may be represented by the formula R—CO—Y, wherein R and Y may represent hydrogen atoms or hydrocarbon radicals which may be substituted. When Y represents a hydrogen atom, the compound is an aldehyde and R may represent H in which case the compound is formaldehyde, or R may represent a hydrocarbon radical or substituted hydrocarbon radical and the compound is a higher aldehyde. When Y represents a hydrocarbon radical or a substituted hydrocarbon radical, R also represents a hydrocarbon radical or substituted hydrocarbon radical which may be the same or different than Y, and the compound is a ketone. For example, aqueous mixtures of the aldehydes as formaldehyde, acetaldehyde, propionaldehyde, the butyraldehydes, the valeraldehydes and the like and the ketones as acetone, methyl ethyl ketone, diethyl ketone, dipropyl ketone, methyl propyl ketone and the like and their homologues, analogues and suitable substitution products may be concentrated in accordance with the process of the invention.

One or more of the hydrogen atoms of the hydrocarbon radicals represented by R and $R^1$ may be substituted by suitable mono- or polyvalent inorganic or organic substituents. For example, one or more hydrogen atoms may be taken up by a halogen atom, hydroxyl group, amino group and the like. As representative substituted aldehydes and ketones, the following may be mentioned: chloracetaldehyde, chlorpropionaldehyde, brom-isobutyraldehyde, chloral-hydrate, chloracetone, dichloracetone, glycol aldehyde, α-hydroxy-propionaldehyde, hydroxy-acetone, chlorhydroxy-acetone, hydroxy-isobutyraldehyde and the like and their homologues and analogues.

A group of suitable carboxylic acid esters may be represented by the formula

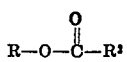

wherein R represents an organic radical and $R^2$ represents a hydrogen atom or an organic radical which may be the same or different than R. Suitable aqueous ester mixtures which may be concentrated include the aqueous mixtures of esters as methyl acetate, ethyl formate, ethyl butyrate, butyl isobutyrate, allyl acetate, isobutenyl acetate, isopropyl acetate, the malonic acid esters and the like and their homologues, analogues and suitable substitution products.

As suitable substituted esters, the following are representative: the esters of the halogenated carboxylic acids, as the ethyl, methyl, propyl, butyl, etc. esters of chloracetic acid, bromacetic acid, chlorisobutyric acid and the like as well as the esters of the hydroxy-acids, the halohydrins, the alkylolamines and the like.

The invention is applicable with excellent results to the concentration of aqueous mixtures and solutions of monohydric and/or polyhydric alcohols. Aqueous mixtures and solutions of the polyhydric alcohols as the glycols, polyglycols, glycerols and the polyhydric alcohols containing more than three carbinol groups may be treated. The monohydric alcohols, solutions of which are particularly adapted to dehydration in accordance with the invention, may be represented by the formula R—OH, wherein R represents an alkyl, alkenyl, aralkyl, aralkenyl, alicyclic or heterocyclic organic radical which may be further substituted. As examples of suitable aliphatic alcohols, aqueous mixtures of which may be dehydrated, the following are representative: ethyl alcohol, propyl alcohol, isopropyl alcohol, normal butyl alcohol, isobutyl alcohol, secondary butyl alcohol, tertiary butyl alcohol, normal amyl alcohol, secondary amyl alcohol, the isoamyl alcohols, tertiary amyl alcohol, the primary, secondary and tertiary hexyl, heptyl, octyl and the like alcohols and their homologues and analogues, the unsaturated alcohols as allyl alcohol, meth-allyl alcohol, the pentenols, hexanols, heptenols and the like and the cyclic and aralkyl alcohols as benzyl alcohol and its homologues, borneol, isoborneol, cyclohexanol, fenchyl alcohol and the like. As examples of suitable substituted alcohols, which may be dehydrated in accordance with the invention, the mono- and di-halohydrins and the mono-, di- and tri-alkylolamines and substitution products may be particularly mentioned. The following compounds are representative of suitable substituted alcohols: ethylene chlorhydrin, propylene chlorhydrin, butylene chlorhydrin, isobutylene chlorhydrin, glycerine monochlorhydrin, glycerine dichlorhydrin, glycidol, chlor-tertiary butyl alcohol, dichlor-tertiary butyl alcohol, methyl glycidol, the polyglycols, the polyglycerols, the alkylolamines as mono-ethanolamine, di-ethanolamine, tri-ethanolamine, mono-propanolamine, the di- and tri-propanolamines, the mono-, di- and tributanol, pentanol, hexanol and the like amines, as well as the homologues, analogues and substitution products of the above and like compounds.

For purposes of convenience, but with no intention to limit the invention thereto, the process will be described with reference to the dehydration of aqueous alcohol mixtures.

In executing the invention, I may first mix the dilute alcohol or aqueous solution of the alcohol with one or more of the suitable ethers herein described, whereby the alcohol is largely or substantially completely extracted by the added ether or ethers, and thereafter I may allow the mixture to stratify, separate the aqueous layer, and subject the layer of ether or ethers containing the extracted alcohol to a distillation whereby the alcohol and the extractant agent or agents may be separated. The extractant agent may be added to the aqueous alcohol mixture and the extraction effected at any desired temperature and pressure, depending upon the boiling temperature of the extractant and the material extracted. In many cases, atmospheric pressure and temperatures of from about 15° C. to about 30° C. are suitable.

In executing the invention, I preferably employ a continuous process. For example, a solvent comprising one or more of the ethers mentioned above may be passed through a vertical contact vessel in an upward flow countercurrently to a stream of the aqueous alcohol solution. In order to obtain more efficient contact of the aqueous and solvent phases, the solvent may be injected into the contact vessel through an orifice under a more or less elevated pressure, or the dispersion of the solvent may be accomplished by stirring or other physical means. In such a manner, finely divided globules of the solvent may be caused to rise through the descending stream of the aqueous alcohol, extracting more and more of the alcohol therefrom as they ascend. If desired the aqueous alcohol may be dispersed throughout the solvent in a similar manner, the solvent thus becoming the continuous phase. As a result of the efficient contact of the two phases and the efficacious solubility characteristics of the ethers used as solvents in the process, the alcohol distributes itself according to its partition coefficient between the water and solvent phases. Thus, the alcohol content of a treated aqueous alcohol solution may be reduced to any desired low value by a suitable control of operating conditions and/or of the relative amount of solvent employed.

The extractant solution consists of substantially only the solvent and the alcohol and is in the majority of cases substantially water-free. The extractant solution may be subjected to a fractional distillation to separate the ether and the extracted alcohol. The recovered ether may be reutilized in the extraction vessel.

In some cases, it may be preferable to accomplish the removal of water from an aqueous alcohol solution, or aqueous solution of an aldehyde, ketone or carboxylic acid ester, by adding to it a required amount of a suitable ether, preferably an aliphatic symmetrical ether containing at least six carbon atoms to the molecule or an aliphatic mixed ether, or a solvent mixture containing such an ether, and then distilling whereby water and the added water-carrier are distilled off. This mode of operation is particularly suitable when the aqueous mixture treated is not very dilute but contains such a small amount of water relative to the organic oxy-compound that the addition of the water-carrying ether thereto will result in a homogeneous solution at a given temperature. The process may be executed in a continuous manner, the ether being circulated in the top of the column. The amount of the ether used to effect the water removal may vary widely. By withdrawing the aqueous layer only from the stratified overhead distillate and totally refluxing the non-aqueous layer, a small amount of ether can remove a relatively much larger amount of water.

The ether to be used with each particular aqueous mixture of an organic oxy-compound to be treated is selected with respect to its boiling temperature relative to the boiling temperature of water. The ether used should have a sufficiently high boiling temperature with respect to the boiling temperature of water so that on distillation of the mixture the ether will carry over sufficient water to result in a distillate stratifiable into two phases, an ether phase and an aqueous phase. The ether chosen should be such that the azeotrope which results in practice, which azeotrope is in some cases binary and in others tertiary, can be separated from the compound undergoing dehydration by distillation.

The above is illustrated by reference to the selection of a suitable ether to effect the dehydration of aqueous alcohol mixtures in accordance with the invention. Anhydrous isopropyl alcohol boils at a temperature of from about 82.0° C. to about 83° C. In the dehydration of an aqueous mixture of isopropyl alcohol, the symmetrical diethyl ether which boils at about 36° C. is unsuitable in that such a small amount of water is carried over that the condensed distillate is homogeneous. If a higher boiling ether, as diisopropyl ether which boils at about 69° C., is used, said higher boiling ether carries over sufficient water to result in a two-phase distillate while at the same time only relatively small amounts of the organic oxy-compound are carried over. As ethers of progressively increasing boiling temperature are used, the ratio of the ether to alcohol in the distillate decreases until said ratio becomes so low that a single phase distillate is obtained. Thus, the boiling temperature of ethyl tertiary amyl ether (B. P. 102° C.) is still sufficiently low with respect to isopropyl alcohol to yield a condensed distillate stratifiable into an ether phase and an aqueous phase, while disecondary butyl ether which boils at about 122° C. under the same conditions carries over so much alcohol that the condensed distillate is homogeneous and can no longer be stratified into two phases. It is seen, therefore, that a suitable ether for dehydrating isopropyl alcohol should boil somewhere within the temperature range of from about 50° C. to about 110° C. For dehydration of higher boiling alcohols, ethers of still higher boiling temperature can be effectively used, that is, the upper limit of the boiling temperature range of the ether can be extended considerably while still obtaining a two-phase condensed distillate. For example, in the dehydration of secondary butyl alcohol which boils at about 100° C., ethers boiling in the temperature range of from about 50° C. to about 150° C. may be effectively used. For higher boiling alcohols, still higher boiling ethers may be employed and the requisite two-phase distillates obtained. Thus it appears that for each organic oxy-compound to be dehydrated there is a preferred boiling temperature range within which the selected ether should boil in order to provide an efficient dehydration process employing distillation means.

The distillation may be effected in any suitable distillation apparatus of the required capacity and efficiency. The aqueous mixture to be dehydrated and the ether or ether mixture may be charged to the kettle of the distillation apparatus severally or in admixture with each other. When distilling apparatus of the required efficiency is used, and a suitable ether of the requisite boiling temperature is employed, the water present in the mixture distills over with the ether and the organic oxy-compound dehydrated as a constant boiling mixture. When substantially all of the water has been distilled from the system in this manner, the excess of the ether, if there is sufficient difference between its boiling temperature and that of the substantially anhydrous organic oxy-compound treated, may be distilled over in practically pure form and reutilized. Finally, only the organic oxy-compound in a substantially anhydrous condition remains in the distillation system. The residue may of course be distilled for the separation of any non-volatile and/or high boiling impurities.

The distillation apparatus may be operated in such a manner that the two-phase condensed distillate, which may comprise ether, water and the organic oxy-compound, is stratified and the water layer discharged while the non-aqueous layer comprising the ether and the organic oxy-compound is intermittently or continuously fed back into the distillation system, for example, directly into the kettle or into the column as reflux. The operation may be continued in this manner until the material in the distillation system is substantially anhydrous and the overhead distillate comprises substantially only the ether or the ether and the organic oxy-compound. When there is sufficient difference between the boiling temperatures, the distillation may be continued to separate the substantially anhydrous materials.

As an alternative mode of operation which is preferably employed in those cases where the ether used to effect water removal may be difficult to separate from the dehydrated organic oxy-compound by distillation means or when the boiling temperature of the ether is higher than that of the alcohol, as for example, when disecondary butyl ether is used to dehydrate aqueous secondary butyl alcohol, the ether is added in a predetermined amount sufficient to remove substantially all or the required amount of the water, and the distillation is effected in such a manner that substantially all of the ether and the required amount of water are removed simultaneously leaving a substantially ether free residue of the organic oxy-compound of the desired water content in the still. Another convenient mode of operating under such conditions comprises starting with an amount of ether less than that required to remove all of the water as above described, distilling, stratifying the distillate, taking off water only and returning the non-aqueous layer to the distillation system until most of the water has been removed, and when that point is reached, taking off both ether and water simultaneously so as to exhaust the kettle of both at the same time.

In some cases, it may be more practical and economical to combine the extraction and azeotropic distillation steps described. For example, in the dehydration of aqueous organic oxy-compound mixtures containing relatively small amounts of water the addition of an excess of the water-carrying ether over the amount required to azeotropically dehydrate the mixture may result in stratification of the mixture into two phases. In such a case, it may be more economical to separate the phases and distill them separately.

The following specific examples illustrate suitable modes of executing the invention. It is to be understood that the invention is not limited to the particular materials treated, to the extractant and water-carrying ethers disclosed, to the relative proportions of said materials and agents, nor to the specific modes of operation described. While the specific operating conditions, the proportions of the solvent and the particular solvent or water-carrying agent used will naturally differ when different aqueous mixtures of organic oxy-compounds are treated, the procedure is in general practically the same.

*Example I*

About 500 volumes of a constant boiling mixture of isopropyl alcohol and water (containing about 87.7% by weight of isopropyl alcohol) and about 45 volumes of ethyl tertiary butyl ether (B. P. 72.8° C.) were charged to the kettle of an efficient distillation apparatus. The fractionating still column was provided with a total reflux head, means for withdrawing the aqueous layer of the condensed and stratified condensate and means for returning the upper layer to the still as reflux in the column.

The mixture was distilled. The aqueous layer of the condensed distillate was withdrawn and the non-aqueous layer was returned to the system. When about 66 volumes of the aqueous layer had been withdrawn, the condensed overhead distillate no longer stratified into two layers. The distillation was then continued until substantially all of the ether had been removed. This condition was reached when about 69 volumes of the ether cut had been collected and a sample of the condensed distillate no longer showed turbidity on dilution with water.

The residue in the kettle of the still was substantially anhydrous isopropyl alcohol. It had a boiling temperature of about 82.3° C. and a specific gravity $$\left(d\frac{20}{4}\right)$$

of about 0.7852, and it showed no turbidity on dilution with carbon disulfide or chloroform.

Example II

About 500 volumes of an isopropyl alcohol-water constant boiling mixture and about 45 volumes of methyl tertiary amyl ether were mixed and distilled in the apparatus and according to the method described in Example I.

When about 75 volumes of the aqueous phase had been removed from the system, the condensed distillate no longer stratified into two phases. The distillation was then continued and the ether cut collected until the condensed distillate no longer contained ether. This condition was reached when about 129 volumes of the ether cut had been collected.

The residue was pure, substantially anhydrous isopropyl alcohol.

Example III

About 500 volumes of a tertiary butyl alcohol-water constant boiling mixture (containing about 88.3% by weight of tertiary butyl alcohol) and about 35 volumes of ethyl tertiary butyl ether were charged to a suitable still and distilled as described in Example I.

Stratification of the condensed distillate into two phases ceased when about 62 volumes of the aqueous layer had been removed from the system. To separate the ether from the alcohol, the distillation was continued until an ether cut of about 65 volumes had been collected.

The residue in the still was pure, substantially anhydrous tertiary butyl alcohol; it had a melting point higher than 25° C., a boiling point of about 82.6° C., and it showed no turbidity on dilution with water.

Example IV

A mixture of about 500 volumes of secondary butyl alcohol, 25 volumes of water and 25 volumes of di-normal butyl ether was charged to a fractionating still equipped with a separating head.

Anhydrous secondary butyl alcohol boils at a temperature of about 99.53° C. and di-normal butyl ether boils at a temperature of about 141° C., some 41° C. higher than the alcohol.

The mixture was distilled. A ternary alcohol-ether-water constant boiling mixture was formed. This mixture boiled at about 86.5° C. and on condensation it readily stratified into two phases, thus permitting selective withdrawal of either the ether layer or the aqueous layer. The upper layer of the stratified distillate contained from about 11% to about 12% by volume of the normal butyl ether, which is greater than the initial ether concentration in the kettle. Thus by withdrawing the aqueous layer and controlling the amount of the ether returned to the still, the distillation was conducted so that the water and ether were removed simultaneously, the last portions of the water being distilled with the last portions of the ether and leaving a residue consisting of secondary butyl alcohol substantially devoid of ether and water. In operating in accordance with the method described in this example, it may be more advantageous to use di-secondary butyl ether in lieu of di-normal butyl ether. The azeotrope formed with di-secondary butyl ether has a lower boiling temperature (83° C. to 84° C.) and may be separated more easily from the secondary butyl alcohol. Di-isobutyl ether is also a very suitable ether for use in removing water from secondary butyl alcohol as described.

It is obvious that a great number of process steps and combinations thereof employing a wide variety of suitable conditions as temperatures, pressures, concentrations, etc. can be conceived for removing water from aqueous mixtures of the individual or mixed organic oxycompounds in accordance with the principles of the present invention. It is not my intention to limit the invention to any specific method of practicing the same. Any method or process, either batch or continuous, which comprises concentrating aqueous mixtures of organic oxy-compounds by treating them with an ether having the properties herein described, is believed to be within the scope of the invention.

I claim as my invention:

1. A process for the removal of water from an aqueous mixture of an organic oxy-compound of the general formula R—X, wherein R represents an organic radical and X represents an oxy-radical of the group consisting of —OH, —COH, —OOCH, —COR$_1$ and —COOR$_1$, R$_1$ representing an organic radical, which comprises adding to said mixture a solvent for the organic oxy-compound which solvent is substantially immiscible with water and comprises essentially at least one ether selected from the group consisting of the aliphatic mixed ethers and the aliphatic symmetrical ethers, the latter containing at least six carbon atoms to the molecule, and separating by physical means the excess of water and the solvent from the organic oxy-compound, whereby said compound is recovered in a more concentrated state.

2. A process for the removal of water from an aqueous mixture of an organic oxy-compound of the general formula R—X, wherein R represents an organic radical and X represents an oxy-radical of the group consisting of —OH, —COH, —OOCH, —COR$_1$ and —COOR$_1$, R$_1$ representing an organic radical, which comprises adding to said mixture an ether selected from the group consisting of the aliphatic mixed ethers and the aliphatic symmetrical ethers, the latter containing at least six carbon atoms to the molecule, and separating by physical means the excess of water and the ether from the organic oxy-compound, whereby said compound is recovered in a more concentrated state.

3. A process for the removal of water from an aqueous mixture of an organic oxy-compound of the general formula R—X, wherein R represents a hydrocarbon radical which may be further substituted and X represents an oxy-radical of the group consisting of —OH, —COH, —OOCH, —COR₁ and —COOR₁, R₁ representing a hydrocarbon radical which may be further substituted, which comprises subjecting the aqueous organic oxy-compound to a selective extraction with an agent comprising essentially an ether selected from the group consisting of the aliphatic mixed ethers and the aliphatic symmetrical ethers, the latter containing at least six carbon atoms.

4. A process for the removal of water from an aqueous mixture of an organic oxy-compound of the general formula R—X, wherein R represents a hydrocarbon radical and X represents an oxy-radical of the group consisting of —OH, —COH, —OOCH, —COR₁ and —COOR₁, R₁ representing a hydrocarbon radical, which comprises mixing the liquid aqueous organic oxy-compound with an ether selected from the group consisting of the aliphatic mixed ethers and the aliphatic symmetrical ethers, the latter containing at least six carbon atoms to the molecule, removing the aqueous layer formed, and subjecting the ether layer containing the dissolved organic oxy-compound to fractional distillation to separate the ether therefrom.

5. A process for the removal of water from an aqueous mixture of an organic oxy-compound of the general formula R—X, wherein R represents a hydrocarbon radical and X represents an oxy-radical of the group consisting of —OH, —COH, —OOCH, —COR₁ and —COOR₁, R₁ representing a hydrocarbon radical, which comprises mixing the liquid aqueous organic oxy-compound with an ether selected from the group consisting of the aliphatic mixed ethers and the aliphatic symmetrical ethers, the latter containing at least six carbon atoms to the molecule, and distilling the resulting mixture to remove the excess of water and the ether from the organic oxy-compound, whereby said compound is recovered in a more concentrated state.

6. A process for the removal of water from an aqueous mixture of an organic oxy-compound of the general formula R—X, wherein R represents a hydrocarbon radical and X represents an oxy-radical of the group consisting of —OH, —COH, —OOCH, —COR₁ and —COOR₁, R₁ representing a hydrocarbon radical, which comprises mixing the liquid aqueous organic oxy-compound with an ether selected from the group consisting of the aliphatic mixed ethers and the aliphatic symmetrical ethers, the latter containing at least six carbon atoms to the molecule, distilling the resulting mixture to drive off an azeotrope comprising the ether and water, condensing the vapors of the azeotrope, separating the aqueous phase from the ether phase, and returning the ether phase to the distillation system until the water content of the organic oxy-compound is decreased to the desired extent.

7. A process for the removal of water from an aqueous mixture of an organic oxy-compound of the general formula R—X, wherein R represents a hydrocarbon radical and X represents an oxy-radical of the group consisting of —OH, —COH, —OOCH, —COR₁ and —COOR₁, R₁ representing a hydrocarbon radical, which comprises mixing the liquid aqueous organic oxy-compound with an ether selected from the group consisting of the aliphatic mixed ethers and the aliphatic symmetrical ethers, the latter containing at least six carbon atoms to the molecule, distilling over and condensing an azeotrope comprising the added ether and water, separating the aqueous phase from the ether phase, returning the ether phase to the distillation system until the condensed distillate no longer stratifies into two phases, and continuing the distillation until substantially all of the ether has been distilled from the system.

8. A process for the removal of water from an aqueous solution of an alcohol which comprises adding to the alcohol solution a solvent for the alcohol which solvent is substantially immiscible with water and comprises essentially an ether selected from the group consisting of the aliphatic mixed ethers and the aliphatic symmetrical ethers, the latter containing at least six carbon atoms to the molecule, and separating by physical means the excess of water and the added solvent from the alcohol, whereby the alcohol is recovered in a more concentrated state.

9. A process for the removal of water from an aqueous solution of an alcohol which comprises subjecting the aqueous alcohol solution to a selective extraction with a solvent selected from the group consisting of the aliphatic mixed ethers and the aliphatic symmetrical ethers, the latter containing at least six carbon atoms.

10. A process for the removal of water from an aqueous solution of an alcohol which comprises mixing the aqueous alcohol with an ether selected from the group consisting of the aliphatic mixed ethers and the aliphatic symmetrical ethers, the latter containing at least six carbon atoms to the molecule, subjecting the resulting mixture to distillation to distill over simultaneously substantially all of the water and the ether, and recovering the substantially anhydrous alcohol.

11. A process for the removal of water from an aqueous solution of an alcohol which comprises mixing the aqueous alcohol with an ether selected from the group consisting of the aliphatic mixed ethers and the aliphatic symmetrical ethers, the latter containing at least six carbon atoms to the molecule, distilling over and condensing an azeotrope comprising the added ether and water, separating the aqueous phase from the ether phase, returning the ether phase to the distillation system until the condensed distillate no longer stratifies into two phases, and continuing the distillation until substantially all of the ether has been distilled from the system.

12. A process for the removal of water from an aqueous solution of an aliphatic alcohol which comprises mixing the aqueous aliphatic alcohol with an ether selected from the group consisting of aliphatic mixed ethers and aliphatic symmetrical ethers, the latter containing at least six carbon atoms to the molecule, and subjecting the resulting mixture to distillation to separate the ether and water from the alcohol, whereby the alcohol is recovered in a substantially anhydrous condition.

13. A process for the removal of water from an aqueous solution of isopropyl alcohol which comprises mixing the aqueous isopropyl alcohol with a mixed aliphatic ether boiling in the temperature range of from about 50° C. to about 110° C., and subjecting the resulting mixture to distillation to separate the ether and the water therefrom, whereby the isopropyl alcohol is recovered in a substantially anhydrous condition.

14. A process for the removal of water from an aqueous solution of isopropyl alcohol which comprises mixing the aqueous isopropyl alcohol with ethyl tertiary butyl ether, distilling the mixture to drive off an azeotrope comprising the ether and water, condensing the vapors of the azeotrope, separating the aqueous phase from the ether phase, returning the ether phase to the distillation system until the condensed distillate no longer stratifies into two phases, and continuing the distillation until substantially all of the ether has been distilled from the system.

15. A process for the removal of water from an aqueous solution of a butyl alcohol which comprises mixing the aqueous butyl alcohol with an ether selected from the group consisting of the aliphatic mixed ethers and the aliphatic symmetrical ethers, the latter containing at least six carbon atoms to the molecule, and subjecting the resulting mixture to distillation to separate the ether and the water therefrom, whereby the butyl alcohol is recovered in a substantially anhydrous condition.

16. A process for the removal of water from an aqueous solution of tertiary butyl alcohol which comprises mixing the aqueous tertiary butyl alcohol with ethyl tertiary butyl ether, distilling the mixture to drive off an azeotrope comprising the ether and water, condensing the vapors of the azeotrope, separating the aqueous phase from the ether phase, returning the ether phase to the distillation system until the condensed distillate no longer stratifies into two phases, and continuing the distillation until substantially all of the ether has been distilled from the system.

17. A process for the removal of water from an aqueous solution of an organic oxy-compound of the class consisting of the aliphatic alcohols, aldehydes, ketones and carboxylic acid esters which comprises adding to the aqueous solution of the organic oxy-compound an ether selected from the group consisting of the aliphatic mixed ethers and the aliphatic symmetrical ethers, the latter containing at least six carbon atoms to the molecule, and distilling the resulting mixture to separate water therefrom as an azeotrope with the added ether.

18. A process for the removal of water from an aqueous solution of an organic oxy-compound of the class consisting of the aliphatic alcohols, aldehydes, ketones and carboxylic acid esters which comprises adding to the aqueous solution of the organic oxy-compound an aliphatic mixed ether, and distilling the resulting mixture to separate water therefrom as an azeotrope with the aliphatic mixed ether.

THEODORE EVANS.